(No Model.)
E. J. HESS & W. LE B. HAWES.
JUMP SEAT VEHICLE.
No. 438,884. Patented Oct. 21, 1890.
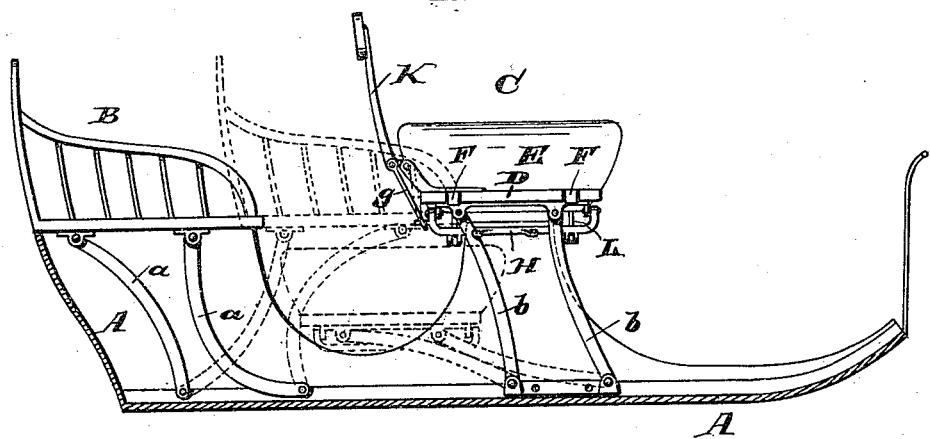
Fig. 1.
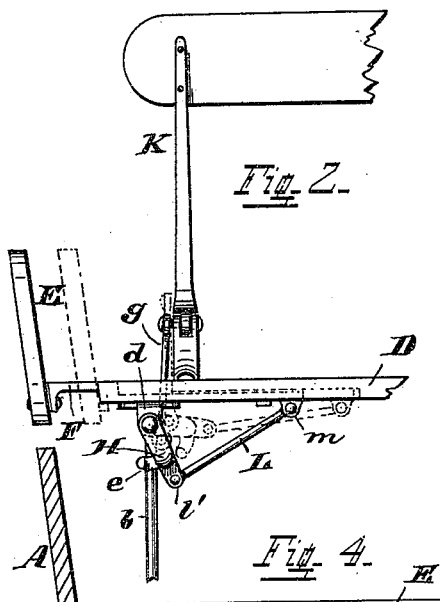
Fig. 2.
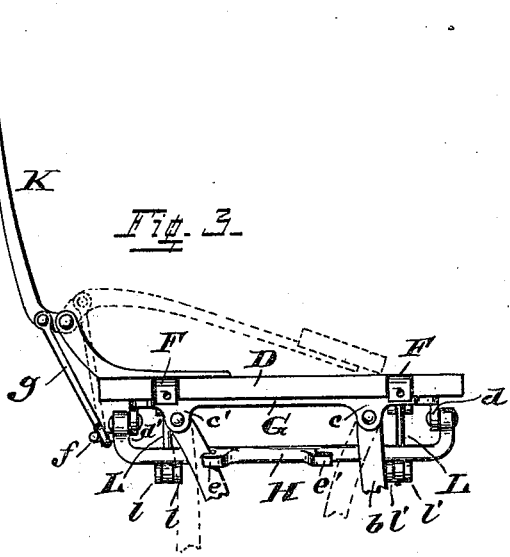
Fig. 3.
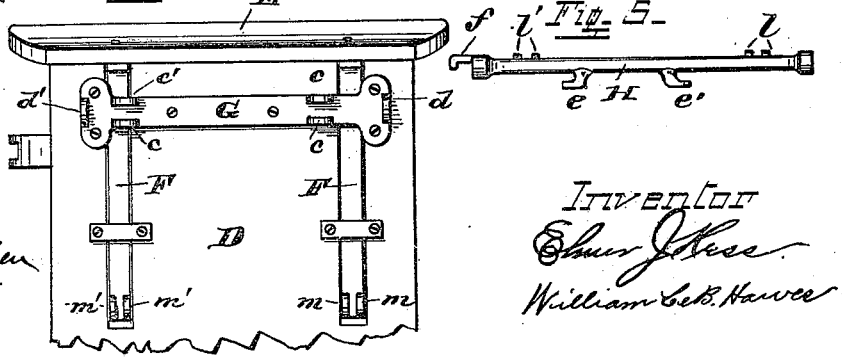
Fig. 4.
Fig. 5.
Attest
Alfred M. Allen
H. C. Lindsay
Inventor
Elmer J. Hess
William Le B. Hawes

UNITED STATES PATENT OFFICE.

ELMER J. HESS, OF WYOMING, AND WILLIAM LE B. HAWES, OF CINCINNATI, ASSIGNORS TO THE DAVIS CARRIAGE COMPANY, OF CINCINNATI, OHIO.

JUMP-SEAT VEHICLE.

SPECIFICATION forming part of Letters Patent No. 438,884, dated October 21, 1890.

Application filed August 4, 1890. Serial No. 360,898. (No model.)

*To all whom it may concern:*

Be it known that we, ELMER J. HESS and WILLIAM LE B. HAWES, citizens of the United States, residing, respectively, at Wyoming and Cincinnati, in the county of Hamilton and State of Ohio, have invented certain new and useful Improvements in Jump-Seat Vehicles, of which the following is a full, clear, and exact description, reference being had to the accompanying drawings, forming part of this specification.

Our invention relates to improvements in jump-seated vehicles in which the front seat, when in use, can be readily extended so as to become of the same length as the back seat; and it consists in such new and improved construction and arrangement of parts, as will hereinafter be more particularly pointed out and claimed.

In the construction of jump-seated vehicles the front seat, when not in use, is folded back into the body of the vehicle, allowing the back seat to be brought forward over the front seat, and thus the vehicle can be used either as a one-seated or a two-seated conveyance. In order to thus fold back the front seat within the body of the wagon, this seat has to be made considerably shorter than the width of the vehicle, and consequently in a vehicle of ordinary size these jump-seats as ordinarily constructed are too narrow to seat two persons comfortably. This hitherto necessary narrowness of the front seat has been one of the great objections to vehicles of this class, and it is to remedy this defect that we have directed our invention, which consists in such a construction of the front seat that its sides may be extended to the proper width when the seat is brought up and the lazy-back raised, to be again contracted upon the turning down of the lazy-back preparatory to folding the seat down into the body of the vehicle.

In the drawings, Figure 1 is a side view of our improved vehicle with side of wagon-body and running-gear removed. Fig. 2 is a front view of one end of the front seat with a portion of the wagon-body in section. Fig. 3 is a side view of same. Fig. 4 is a bottom view of the same with the jump-irons and their connections removed. Fig. 5 is a top view of the lock-bar for the jump-irons.

A is the body of the vehicle, within which is supported the seats B and C. These seats are pivoted in the usual way to jump-irons $a$ $a$ and $b$ $b$, upon which the seats swing, so that the front seat can be folded down into the body of the vehicle and the back seat brought forward over same into the positions shown by the dotted lines in Fig. 1.

The construction of the front seat C is as follows, reference being had to only one side of the seat, although it will be understood that all the parts are duplicated for the other side:

D is the bottom of the seat, of sufficient length to readily pass between the sides of the wagon-body, and E E are the side pieces, of the usual size; but instead of being rigidly attached to the bottom piece D these sides are firmly secured by bolts or otherwise to the slide-bars F F, which slide back and forth in grooves or trenches in the bottom D, so as to allow the sides to be extended out from the bottom D, as shown in Fig. 2.

Rigidly secured to the bottom D by screws or otherwise is the plate or bar G, having the lugs $c$ $c$ $c'$ $c'$ and $d$ $d'$ at opposite sides. Between these lugs $c$ $c$ and $c'$ $c'$ are pivoted the jump-irons $b$ $b$, which are also pivoted at the other end to the bed of the wagon, so that the seat will swing forward on the irons and be supported by them in the usual way, it being of course understood that these parts are all duplicated for the other end of the seat. Pivoted to the lugs $d$ $d'$ of the bar G is the lock-bar H, which passes across within the jump-irons $b$ $b$. This lock-bar H is provided with the lugs or hooks $e$ $e'$, which, when the lock-bar is swung down, catch over the jump-irons $b$ $b$ and prevent the seat from swinging back or forward after it is raised. At the back end of this lock-bar H is the lug or hoof $f$, by which the bar is connected with the supports K of the lazy-back by the link $g$, the lazy-back being hinged to the seat in the usual way.

It will be seen that upon the turning down of the back the link $g$ will be brought into the position shown by the dotted lines in Fig. 3 and the lock-bar swung inward into the position shown by dotted lines in Fig. 2. Before turning down the back, however, the seat must be pushed forward slightly to release the jump-irons from the hooks $e$ $e'$, and then the lock-bar being thrown out of the way by lowering the lazy-back the seat can be lowered within the wagon-body. Cast integral with the lock-bar H are the lugs $l\ l$ and $l'\ l'$, extending downward and inward, and pivoted between these lugs are the links L L, which connect the lock-bar with the slide-bars F F, to which the sides of the seat are attached, these links being attached by the lugs $m\ m$ and $m'\ m'$ on the under side of the slide-bars. It will thus be seen that when the lazy-back is raised the lock-bar will be swung down into a position to lock the jump-irons, and at the same time the links L L will be drawn downward and outward, thus operating on the slide-bars F F to extend outwardly the sides E of the seat, as shown in Fig. 2. When the lazy-back is lowered, the seat having first been pushed slightly forward, the lock-bar will be thrown up out of the way and the links L L will carry in with them the slide-bars F F and sides E into the position shown by dotted lines, Fig. 2, thus contracting the seat so that it will readily pass between the sides of the wagon-body.

Having thus described our invention, what we claim, and desire to secure by Letters Patent, is—

1. In a jump-seat for vehicles, the combination, with a seat pivotally supported therein, of a pivoted lock-bar to embrace the supports, extensible sides for the seat, and links connecting said lock-bar and extensible sides so that the seat may be extended with the locking of the supports, substantially as shown and described.

2. In a jump-seat for vehicles, the combination, with a pivotally-supported seat having extensible sides and lazy-back hinged thereto, of lock-bars to embrace the supports pivoted to said seat, and links connecting the extensible sides and lazy-back with said lock-bars so that the raising of the back will simultaneously extend the sides and lock the seat, substantially as shown and described.

ELMER J. HESS.
WILLIAM LE B. HAWES.

Witnesses:
LEE GRANDE GRIBBLE,
ALFRED M. ALLEN.